3,169,995
PROCESS FOR THE PREPARATION OF TERTIARY ALKYL AMINES
Gustave Roy, Versailles, Louis Colson, Vitry-sur-Seine, and Maurice Decuypere, Choisy-le-Roi, France, assignors to Commissariat à l'Energie Atomique, Paris, France
No Drawing. Filed July 18, 1961, Ser. No. 124,781
Claims priority, application France, Aug. 10, 1960, 835,546
3 Claims. (Cl. 260—585)

This invention relates to a process for the preparation of tertiary amines.

It relates particularly, but not exclusively, to a process for preparing trialkylamines in which the three alkyl groups are identical and are each constituted by an alkyl radical having at least six carbon atoms, since it is with such amines that the invention would appear to be of greatest interest.

It is a general object of the invention to modify the preparation of tertiary amines so that it corresponds better than heretofore to various practical requirements and particularly so that the desired trialkylamines can be obtained in a simple manner and in good yields.

According to the invention, a process is provided for the preparation of tertiary amines of the trialkylamine type, which comprises reacting gaseous ammonia with at least one alkyl bromide, the alkyl radical of which has at least six carbon atoms and is an alkyl radical of the trialkylamine to be prepared, the alkyl bromide being heated to a temperature from 100° C. to 200° C.

Preferably, a catalyst derived from copper is employed. The presence of a catalyst is not essential, but it enables operation to be effected at a temperature approximately 15° C. below the temperature of the reaction in the absence of a catalyst, which is particularly advantageous since the instability of the desired amines increases very rapidly with temperature.

The invention more particularly concerns a method of operation applied to the preparation of amines having three identical hydrocarbon radicals each having eight to eighteen carbon atoms, such amines being utilisable as ion exchangers, for example in the purification of solutions of uranium or other actinides.

The invention also includes the very pure trialkylamines obtained by the process.

It is known to prepare amines by treating alkyl bromides an in autoclave with an alcoholic or aqueous ammonia solution. A mixture of dialkylamines and trialkylamines is thus obtained, but the yields are mediocre and are hardly 40% of the theoretical yield for the tertiary amine and 50% for the two kinds, secondary and tertiary, taken together.

It has been discovered that trialkylamines can be obtained by passing ammonia in the gaseous state into the alkyl bromide corresponding to the trialkylamine. The temperature of the bromide should be from 100° to 200° C. A catalyst is preferably used, particularly one derived from copper. The reaction can be expressed as follows:

(1) 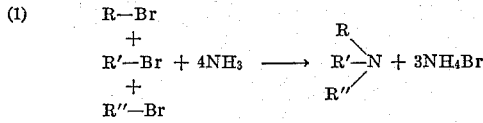

(2) 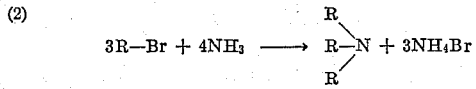

(Equation 2 representing the use of a single alkyl bromide to produce a symmetrical trialkylamine) and yields greater than 80% of the theoretical yield can be obtained.

The reaction is advantageously applied to alkyl bromides in which the alkyl radicals R, R' and R" are identical (Equation 2 above) and have at least six carbon atoms and preferably eight to eighteen carbon atoms.

The catalyst, for instance cuprous iodide, is used in the usual catalytic proportions, preferably about 1% by weight of the reaction mixture; it is introduced in one or more portions during the reaction.

The use of cuprous iodide is particularly advantageous, since it appears that the catalytic action of the copper ion is added to that of the iodine ion which tends to replace the bromine to form an alkyl iodide which is more reactive than the alkyl bromide. The steric hindrance of iodine, which is less than that of bromine, enhances the reactivity.

It is advisable only to begin introducing the gaseous ammonia when the temperature of the reaction medium has reached 100° C.

Another precaution, when initially heating the mixture without introducing the ammonia, is to pass in a small stream of hydrogen to avoid any oxidation which might discolour the final product.

The reaction preferably takes place at atmospheric pressure.

When the reaction is substantially complete, as indicated for example by the reaction mixture ceasing to absorb ammonia, the mixture is allowed to cool and the ammonium bromide precipitate is separated, for example by filtration.

The filtrate is treated to recover the trialkylamine formed. This can be done as follows: The filtrate is subjected to the action of an alcoholic alkali metal hydroxide solution to eliminate the dissolved ammonia. A layer forms, which contains the amines, and this is separated by decantation and then distilled under vacuum to separate its constituents.

Examples of the process of the invention are described below, by way of illustration. The steps described in the examples are to be considered as part of the invention, though any other equivalent steps can also be used without exceeding the scope thereof.

*Example 1.*—Preparation of trilaurylamine $(C_{12}H_{25})_3N$ 3984 g. (16 moles) of lauryl bromide, $C_{12}H_{25}Br$, and 10 g. of cuprous iodide, CuI, were introduced into a saturator apparatus provided with a very efficient agitator system and an inlet tube for introducing a stream of gas into the lower part of the apparatus. The agitator was started, a slow stream of hydrogen was passed into the liquid and the reaction mixture was gently heated to attain a temperature of 90° to 100° C. after about 45 minutes.

The stream of hydrogen was then replaced by a stream of gaseous ammonia. The ammonia input was about 400 bubbles/minute, representing an excess with respect to the absorbable ammonia input. Heating was continued until the temperature of the reaction medium reached about 145°–155° C. after a period of about 1 hour 15 minutes, the input of ammonia being adjusted so as always to provide an excess thereof. The temperature was maintained at 145°–155° C. for 18 hours.

After this period, the apparatus was emptied and the reaction mixture was filtered through cotton cloth under vacuum, to separate the precipitated ammonium bromide.

The filtrate was returned to the apparatus and a further 10 g. of cuprous iodide were added. The mixture was heated to 155° C. under hydrogen and then, from this temperature, under ammonia. After 6 hours, further filtration was effected to separate the ammonium bromide precipitate which had formed. At this point, an analysis effected on an aliquot part of the filtrate indicated that the conversion of lauryl bromide to trilaurylamine was 55% (analysis including a preliminary extraction operation on the fraction).

The filtrate was returned with 10 g. cuprous iodide and the mixture was heated for 13 hours at 155° C. under a stream of ammonia. At this point, there was no further absorption of ammonia, as the gas input and output of the apparatus (under the same conditions of temperature and pressure) were identical. The heating was stopped.

The cooled reaction mixture was filtered. The filtrate was treated with an ethanolic potash solution (decinormal); two layers formed; the heavier layer, containing the amines, was separated by decantation. This layer was distilled under vacuum, which allowed the following to be successively separated:

(1) At 65°–70° C./0.3 mm. of mercury; 80 g. of dodecene;
(2) At 92°–120° C./0.3 mm. of mercury; 182 g. of unreacted lauryl bromide, containing 0.12% of monolaurylamine;
(3) At 120°–140° C./0.5 mm. of mercury; 103 g. of dilaurylamine;
(4) At 226°–228° C./0.2 mm. of mercury; 2375 g. of trilaurylamine.

Altogether, 1389 g. of ammonium bromide, or 88.5% of the theoretical quantity was recovered.

The trilaurylamine was thus obtained in an overall conversion of 85% and in an overall yield, taking account of the lauryl bromide recovered, of 89% of the theoretical yield.

*Example II.—Preparation of tricetylamine* $(C_{16}H_{33})_3N$ 305 g. (1 mole) of cetyl bromide and 3 g. of cuprous iodide were introduced into a 3-neck flask provided with a very efficient agitator, a thermometer, an ammonia inlet to the bottom of the flask and an upright condenser. It was heated to 210°–215° C. (preferably under a stream of hydrogen) and ammonia was introduced with vigorous agitation. Absorption of ammonia was completed after 8 hours of heating at 215° C. The reaction mixture was allowed to cool. When cold, the mixture became solid and was greenish; if the cooling is such that the mixture becomes solid, it is reheated to 80° C. to return it to the liquid state by fusion. 10 ml. of distilled water were added to enlarge the micro-crystals of ammonium bromide which as such are difficult to filter. The mixture was then filtered at 80° C. and the ammonium bromide precipitate on the filter was washed twice with a little cyclohexane.

The weight of the dry precipitate ($NH_4Br$) was 158 g. After eliminating the cyclohexane, the filtrate was treated with a methanolic potash solution (decinormal) and washed with water until neutral to phenolphthalein. The weight of the treated filtrate was 152 g., its alkalimetric titre (determined by perchloric acid) being 93%.

The treated filtrate was then subjected to distillation under vacuum, the boiling point observed being 305°–310° C. at 0.7–0.8 mm. of mercury. This corresponds to the tricetylamine passing over. Some tricetylamine remained in the fractions recovered outside this boiling range and in that which had not distilled. It is in fact difficult to separate dicetylamine and tricetylamine completely by distillation under vacuum.

The fraction mentioned above were united; on cooling, they formed a cake which was taken up hot (at about 80° C.) in 3 litres of water and 1 litre of cyclohexane. The solution was decanted and the organic layer was separated from the aqueous layer. After evaporation of the cyclohexane in the organic layer, 84 g. of product were obtained which was subjected to recrystallisation from ethyl acetate (300 ml. per 50 g. of product) and the filter was washed with a little acetone. This purification process appeared to give better results than distillation under vacuum. Melting point (capillary), 40° C., with softening at 35° C.

Altogether, 138 g. of tricetylamine titrating at 96% were recovered, which corresponds to an overall conversion of 60%.

As shown by the foregoing, it can be seen that by use of the process of the invention trialkylamines are obtained with higher yields, in a simple manner and with less expensive starting materials.

What we claim is:

1. In a process for obtaining trialkylamines, the steps of heating an alkylbromide having from six to eighteen carbon atoms in the alkyl radical to a temperature in the range of from 100° C. to 200° C. and then diffusing gaseous ammonia through the alkylbromide until the ammonia has reacted completely therewith.

2. A process as described in claim 1, said alkylbromide having from 8 to 18 carbon atoms in the alkyl radical.

3. A process as described in claim 1 including the step of adding to the reaction mixture about 1% by weight of the reaction mixture of cuprous iodide.

References Cited by the Examiner
UNITED STATES PATENTS

| | | | |
|---|---|---|---|
| 1,932,518 | 8/28 | Hale | 260—585 |
| 2,192,523 | 3/37 | Olin et al. | 260—583 |

CHARLES B. PARKER, *Primary Examiner.*

L. ZITVER, *Examiner.*